United States Patent [19]

Quick

[11] 4,065,912
[45] Jan. 3, 1978

[54] CANE CUTTING APPARATUS

[75] Inventor: Donald J. Quick, Bundaberg, Australia

[73] Assignee: Massey-Ferguson Services N.V., Curacao, Netherlands

[21] Appl. No.: 700,691

[22] Filed: June 28, 1976

[30] Foreign Application Priority Data

July 12, 1975 United Kingdom ............... 29356/75

[51] Int. Cl.² ........................ A01D 45/10; B26D 7/06
[52] U.S. Cl. ....................................... 56/13.9; 83/345
[58] Field of Search ............................... 56/13.5–14.6, 56/10.2, 53–60; 83/345, 346; 241/79, 221, 222, 282.1

[56] References Cited

U.S. PATENT DOCUMENTS

| 2,546,221 | 3/1951 | Funk | 83/34.5 X |
|---|---|---|---|
| 3,434,270 | 3/1969 | Gaunt et al. | 56/10.2 |
| 3,504,485 | 4/1970 | Johnson | 56/295 |
| 3,995,520 | 12/1976 | Spargo | 83/34.5 |

Primary Examiner—Russell R. Kinsey
Attorney, Agent, or Firm—Robert L. Farris

[57] ABSTRACT

A sugar cane harvester has cane cutting apparatus for chopping cane sticks into billets. The apparatus comprises a pair of rotatable cutting elements carrying projecting axially extending blades which co-operate as the cutting elements rotate in timed relationship. The blades each have a bevelled cutting edge and are mounted so as to come into back-to-back relationship i.e. with the bevelled surfaces facing outwards, when the blades overlap. This minimizes servicing requirements and improves the quality of the cut.

4 Claims, 7 Drawing Figures 4,065,912

CANE CUTTING APPARATUS

This invention relates to cane cutting apparatus and in particular, though not exclusively, to harvesters for sugar cane or the like incorporating such apparatus.

The term "sugar cane or the like" as used in this specification refers to sugar cane and other tall stick-like crops such as bamboo and kenaf. The invention is also applicable to planters e.g. for sugar cane and cassava in which cane sticks are cut into shorter lengths during the planting operation.

The most effective apparatus for cutting sugar cane sticks into pieces or billets in a sugar cane harvester is the kind disclosed in Australian Pat. No. 222,308. Such apparatus comprises a pair of cutting elements, and a drive to contra-rotate the cutting elements in timed relationship, each cutting element having at least one blade and the blades being positioned to co-operate with each other to cut cane sticks passing between the cutting elements as the cutting elements rotate.

However, in sugar cane harvesters incorporating such cane cutting apparatus it is necessary to maintain the blades so that when in their closest co-operating cane cutting position, a gap of no more than half a millimeter exists between the blades. If the gap is larger than this, the trash and the cane is not cut cleanly. In fact some of the cane pieces may not be severed from each other at all — this effect being known as "sausaging". Accordingly, provision has hitherto been made for the blades to be adjusted or replaced as easily as possible. Such adjustment or replacement is time-consuming and/or costly however, particularly in stony areas where damage to the blades by stones fed into the harvester with the crop cannot be avoided. It is an object of the present invention to provide improvements in this respect.

According to the invention there is provided a harvester for sugar cane or the like as defined in claim 1 of the accompanying claims. Other features of the invention are defined in the claims following claim 1.

Embodiments of the invention will now be described by way of example with reference to the accompanying drawings, in which.

Figure 3:
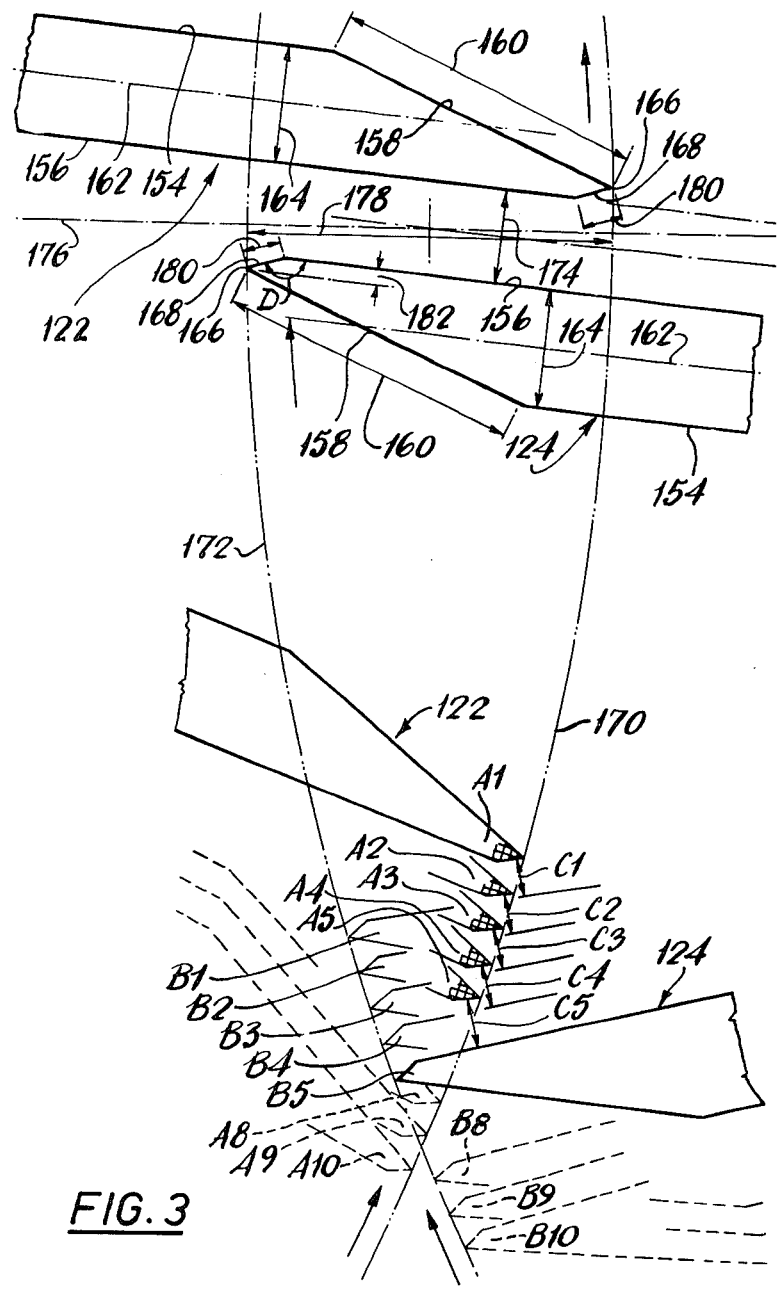
Figures 4, 5, 6, 7:
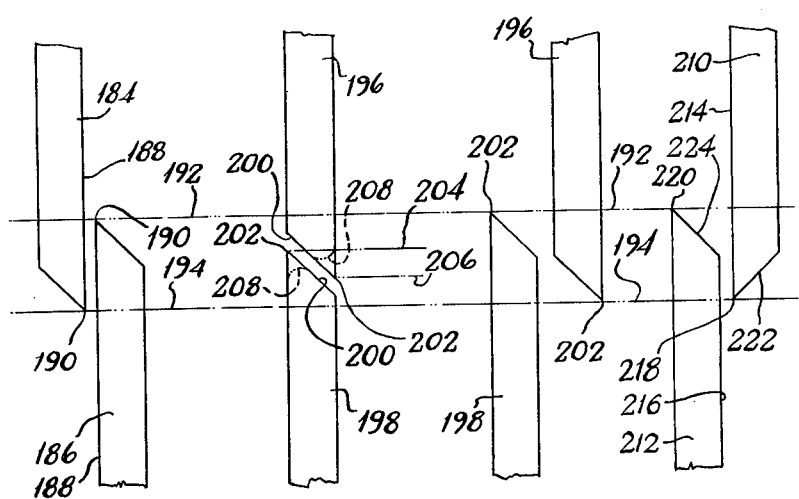

FIG. 3 illustrates, diagrammatically and on a much larger scale, the spacial relationship of two blades of the cane cutting apparatus, as the blades come into cutting relationship; and FIGS. 4 to 7 illustrate, somewhat diagrammatically the relationship of two embodiments of the present invention to previously proposed cane cutting apparatus. FIGS. 4 and 7 show the embodiments of the invention. FIG. 5 shows previously proposed cane cutting apparatus; and FIG. 6 shows the apparatus of FIG. 5 modified so as to achieve the same length of blade overlap as the embodiment shown in FIG. 4.

Figure 1:
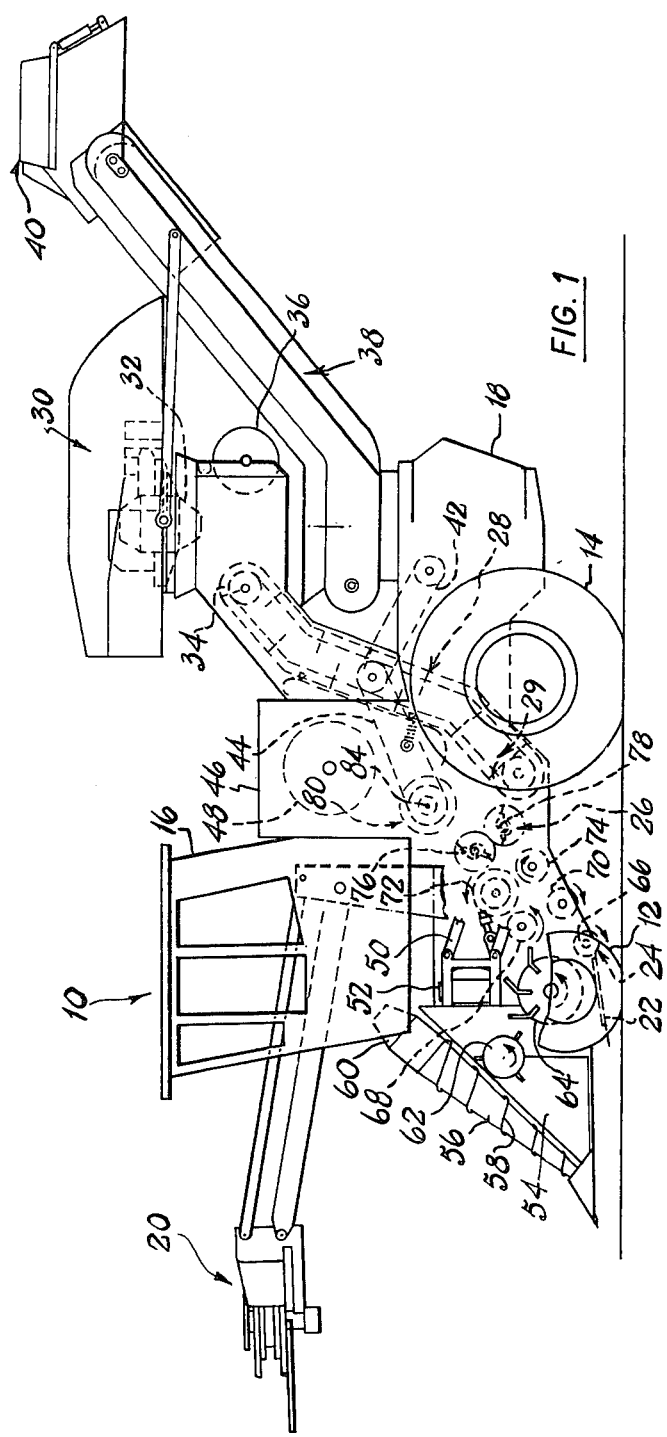
FIG. 1 shows a sugar cane harvester in side elevation with some of its internal structure including cane cutting apparatus for cutting cane indicated by broken lines.

As shown in FIG. 1, a sugar cane harvester 10 comprises steerable front support wheels 12, drivable rear support wheels 14, a control cabin 16, a housing 18 for a rear mounted engine, cane topping apparatus 20 for removing tops from standing cane, base cutting means 22 operable to sever cane sticks from their roots, stick feeding means 24 operable to feed severed canes into the harvester and cane cutting apparatus 26 positioned to receive whole cane sticks from said stick feeding means and operable to cut each stick into billets about 40 centimeters in length.

A chain and slat primary elevator conveyor 28 is positioned to receive billets at its lower end 29 from the cane cutting apparatus 26 and carries the billets to primary trash removal apparatus 30 comprising a fan 32 to pass air through the cascade of billets falling from the upper end 34 of conveyor 28. An air permeable freely rotatable roller 36 admits air to trash removal apparatus 30.

A slewable chain and slat secondary elevator 38 receives billets from elevator 28 and conveys them to secondary trash removal apparatus 40 where air is drawn through the cascade of billets as they fall into a transport vehicle (not shown).

FIG. 1 also indicates the positions of drive belts 42 and 44 transmitting drive forwards from the engine to the various crop handling assemblies, a radiator housing 46 and associated fan and air cleaner 48 for cooling the liquid coolant from the harvester's engine, and one 50 of a pair of height-adjustable mountings for the king pins 52 of front wheels 12.

At the forward end of the harvester 10 are provided a pair of laterally spaced crop gathering walls 54 defining a throat and each surmounted by a rotatable tapering crop lifter 56 carrying a helical flight 58 and driven by a hydraulic motor in a housing 60 at its upper end.

The crop gathering walls 54 lead to the base cutting means 22 and stick feeding means 24. A drivable transverse primary feed-in roller 62 is mounted between walls 54 and has a series of radial paddles. A larger secondary feed in roller 64 having both radial paddles and curved prongs is mounted above base-cutting means 22.

Base cutting means 22 comprises a pair of contrarotatable discs having projecting blades and is followed by a butt lifter roller 66 and two pairs of spaced paddle-type feeding and cleaning rollers 68, 70 and 72, 74 located in a feed channel (not shown) through which all the crop passes. Rollers 72, 74 feed whole sticks of cane directly to the cane cutting apparatus 26, which will now be described in detail.

Figure 2:
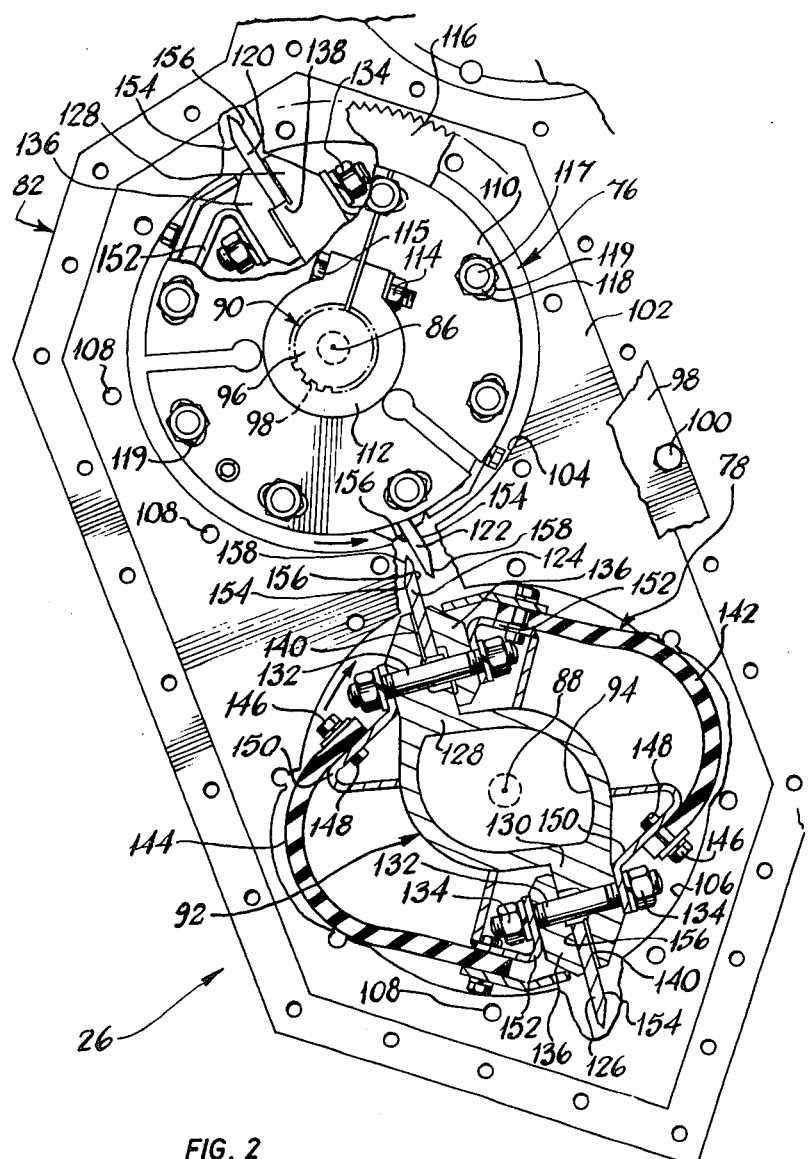
FIG. 2 shows, again in side elevation, but on a larger scale the cane cutting apparatus of FIG. 1, with certain parts of the surrounding structure cut away for purposes of illustration.

As shown in FIGS. 2 and 3, cane cutting apparatus 26 comprises a pair of spaced cutting elements 76, 78 which are driven from belt 44 through a combined clutch and flywheel 80 and a train of gears (not shown). The train of gears is housed in a gearbox 82 and transmits drive from a transverse shaft (not shown) lying on the axis 84 of flywheel 80 to both chopper drums 76 and 78, so that they rotate in opposite directions, as indicated by the arrows in the drawings, about their respective spaced parallel transverse axes 86 and 88.

The cutting elements 76 and 78 comprise respective central shafts 90 and 92 journalled in end bearings (not shown) mounted on the feed channel (not shown). Each shaft has a central hollow portion 94 extending along a major portion of its length and solid end portions 96 formed with drive-transmitting splines 98.

In FIG. 2 several items of structure have been omitted or cut away, for purposes of illustration. Furthermore, the lower cutting element 78 is shown in section, the section being taken at a location spaced from the ends of shaft 92 in order to illustrate hollow portion 94 of the shaft.

Gearbox 82 has a removable front plate 98 retained by bolts 10. A rear wall 102 of the gearbox is formed with circular apertures 104, 106 through which the cutting elements 76, 78 can be passed, after removal of two blades (to be described below) from each cutting element.

Apertures 104 and 106 serve to locate two bearing mounting plates (not shown) one for each aperture, the plates carrying bearings for their respective cutting element shafts 90 and 92. The bearing mounting plates are secured in position by bolts (not shown) passing through apertures 108 in rear wall 102.

The shaft 90 of the upper cutting element 76 carries a split drive wheel 110 having an internally splined hub 112 held in driving engagement with the splines 98 of shaft 90 by a nut 114 and associated bolt 115. An annular gear wheel 116 is secured by eight bolts 117 and associated nuts 118 to drive wheel 110. Bolts 117 pass through slots 119 in the drive wheel whereby a small amount of angular adjustment of chopper drum 76 relative to gear wheel 116 is possible, for a purpose to be described. Gear wheel 116 meshes with a drive input idler gear (not shown) forming part of the drive train to the chopper drums 76 and 78, and it also meshes with a gear wheel (not shown) identical in size to itself and mounted on the shaft 92 of the lower chopper drum 78 whereby the cutting elements 76, 78 contra-rotate about axes 86, 88.

Each of the cutting elements 76 and 78 has a pair of outwardly-projecting blades 120, 122 and 124, 126. The blades of each pair each extend parallel to the axis of their respective cutting element across the full width of the feed channel (not shown) in which the cutting elements are mounted.

A pair of outwardly-projecting flanges 128 and 130 are formed on opposite sides of each of the shafts 90 and 92. The flanges extend along the full cutting length of the cutting elements and are apertured to receive a series of threaded studs 132 having associated nuts 134.

Each of the blades 120, 122, 124 and 126 is clamped in position by its studs 132 acting through an apertured clamping plate 136 extending lengthwise of the blade. The blades are positioned by abutment of their rear edges against a shoulder 138 formed in each flange 128. A thin packing plate 140 is sandwiched between each of the blades and their respective flanges 128.

A pair of cane feeding and guide members 142, 144 each in the form of a strip of fabric-reinforced rubber conveyor belting is mounted on each of the cutting elements 76 and 78. Each guide member is clamped by a series of bolts 146 and associated nuts 148 to flanges 150 and 152 at the leading and trailing edges respectively of the guide member, with respect to the direction of rotation of the cutting element. The flanges are mounted on the studs 132. In use the cane feeding and guide members assist in feeding cane sticks between the cutting elements, in guiding the cane billets away from the cutting elements and in preventing circulation of billets with the cutting elements as the latter rotate.

The blades 120, 122, 124 and 126 are positioned so as to overlap and co-operate with each other in pairs so as to cut cane sticks passing between the cutting elements 76 and 78. Each blade has first and second parallel opposite side faces 154 and 156 respectively and a bevelled cutting edge 158 at one edge of said faces. The length of the cutting edge extends along the full length of the blade (in a direction parallel to axes 86 and 88).

Referring now to FIG. 3, it can be seen that the width 160 of each bevelled cutting edge 158 extends from the first side face 154 beyond the centre line 162 of the thickness 164 of the blade to the apex 166 of the cutting edge. Furthermore, when the blades are in their overlapping cutting relationship shown in FIG. 3, it can be seen that the second side face 156 of one blade 122 overlaps and is in face-to-face relationship with the second side face 156 of the other blade 124.

A second bevelled edge 168 is formed on each of the blades of the cutting elements. The second bevelled edge extends from the second side face 156 to the apex 166 of the cutting edge of the blade.

The lower portion of FIG. 3 illustrates diagrammatically the spacial relationship of the blades of the cutting elements as they come into co-operating overlapping relationship. The overlapping arcs 170 and 172 represent the paths traced by the apexes 166 of the blades 122 and 124 respectively.

In FIG. 3, eight positions of the blade 122 are indicated by references A1, A2, A3, A4, A5, A8, A9 and A10. The position of blade 124 corresponding to each of these positions is indicated by references B1, B2, B3, B4, B5, B8, B9 and B10 respectively. The clearance between the blades (between second bevelled edge 168 of blade 122 and second side face 156 of blade 124) in five of these positions is indicated by references C1 to C5.

Preferred ranges of dimensions for the blades of the cutting elements are indicated below:

1. the shortest distance 174 between the second side faces 156 of the blades when the said second side faces are in parallel relationship (i.e. when equally spaced from the line 176 joining the axes 86, 88 of rotation of the cutting elements 76, 78) lies in the range 4 to 8 millimeters;

2. the overlap 178 of the arcs 170 172 traced by the apexes 166 of the blades 122, 124 (or 120, 126), the overlap being measured along the line 176 joining the axes 86, 88 of rotation of the cutting elements, lies in the range 1 to 3 centimeters;

3. the interior angle "D" between the second side face 156 of at least one of the blades, and the second bevelled edge 168 lies in the range 135° to 160° and is preferably 150°;

4. the width 180 of the second bevelled edge 168 of at least one of the blades is not greater than one quarter of the width 160 of the first bevelled edge 158 thereof;

5. the displacement 182 of the apex 166 of the cutting edge of at least one of the blades from the plane containing the second side face 156 thereof measured at right angles to said plane is from 0.13 millimeters to 2.54 millimeters;

6. the angle between a plane containing the first bevelled edge 158 of at least one of the blades and a plane containing the second side face 156 of that blade is from 15° to 30° and is preferably 20°.

In use, severed whole cane sticks are fed, butt end first, between cutting elements or chopper drums 76, 78 by cleaning and feeding rollers 68 to 74. As the cutting elements rotate, their blades co-operate in pairs 122, 124 and 120, 126 to cut the cane into billets about 40 centimeters in length. The billets are then conveyed rearwards and subjected to the action of the two sets of trash removal apparatus 30 and 40 before being dropped from the upper end of elevator 38 into a trailer (not shown).

The blades of the cutting elements begin to cut into opposite sides of the layer of cane sticks being fed between the cutting elements 76, 78 at a position dependent upon the thickness of the cane layer. Under usual harvesting conditions, in this position the blades are considerably further apart than the position A10/B10 shown in FIG. 3, and the cane sticks are all completely cut through by the time the blades reach the position A8/B8.

The advantages provided by the above embodiment of the invention will now be discussed with reference to FIGS. 4, 5 and 6.

FIG. 4 shows a pair of blades 184, 186 mounted according to the invention, so as to come into "back-to-back" relationship i.e. with their second side faces 188 in overlapping and face-to-face relationship. The amount of overlap between the apexes 190 of the blades is indicated by the broken parallel lines 192, 194 touching the apexes.

FIG. 5 shows a pair of blades 196, 198 mounted in the manner proposed hitherto so as to come into "bevel to bevel" relationship i.e. with their bevelled cutting edges 200 in face to face relationship. The amount of overlap between the apexes 202 of the blades is indicated by the broken parallel lines 204, 206 touching the apexes.

As can be clearly seen, far less overlap of the blades is possible with the FIG. 5 blade relationship than with that of FIG. 4.

FIG. 6 illustrates how it could be attempted to increase the overlap of the blades 196, 198 of FIG. 5 to that of FIG. 4, so that the apexes 202 touch lines 192, 194. It is clear that in FIG. 6 the apexes 202 are very widely spaced along the length of lines 192, 194. This means that the blades will bite into the opposite sides of a layer of cane being cut at positions even more widely spaced than this.

Thus it is apparent that by arranging the blades "back-to-back" the invention allows the overlap of the blades to be considerably increased without increasing the separation along the length of a cane stick at which the two blades bite into the stick from opposite sides.

The increased overlap of the blades renders the accuracy of setting the blades relative to each other far less important than with the FIG. 5 blade relationship. The invention allows a gap of up to 3 millimeters between the blades at their closest position to exist while still satisfactorily cutting cane, whereas with the FIG. 5 blade relationship the gap must be no more than half of one millimeter in order to cut trash cleanly.

A further consequence of the increased overlap of the blades is that the cane cutting apparatus is less susceptible to stone damage and general wear and tear than with the FIG. 5 blade relationship. In FIG. 5, dotted lines 208 indicate the position of the apexes of the blades after a not unusual degree of wear and stone damage. As can be seen after such wear, there is no overlap of the blades at all and effective cutting of cane and trash is out of the question. As can readily be appreciated from FIG. 4, the same degree of wear in blades mounted according to the invention has almost no effect on the cutting effectiveness of the cane cutting apparatus.

The importance of minimizing the separation along the length of the cane sticks at which the blades cut into opposite sides of the sticks arises from the fact that the cane sticks have to split longitudinally between the two cuts and, obviously, the shorter the split needed then the more easily is complete severance of the stick pieces achieved. Furthermore, with widely longitudinally spaced blades the cane sticks can bend between the blades, whereby no severance of the cane is achieved at all.

FIG. 7 shows a further embodiment of the invention in which blades 210, 212 are arranged in "bevel-to-back" relationship. That is to say, when the blades are in overlapping cutting relationship, as shown in FIG. 7, the second side face 214 of blade 210 (using the same terminology as in the previous embodiment) overlaps and is in face-to-face relationship with the first side face 216 of blade 212.

The FIG. 7 blade arrangement is less preferable than that of FIG. 4 since the spacing of the apexes 218, 220 of blades 210, 212 along the length of lines 192, 194 is greater than in FIG. 4. However much greater blade overlap is achieved than in the conventional arrangement of FIG. 5, and this is achieved with a much smaller blade apex separation than in FIG. 6. Furthermore the FIG. 7 blade arrangement provides an improved attitude of the blades relative to the bundle or mat of cane being chopped whereby the cane sticks are cut more nearly at right angles to their length than in the case of the FIG. 5 blade arrangement. In FIG. 7 the direction of cane flow is right to left i.e. with the bevelled cutting edges 222, 224 of the blades facing in the direction of forward motion of the harvester.

Among modifications to the above embodiments which fall within the scope of the invention are the use of one or three or more blades on one or each of the cutting elements. Furthermore the cutting elements could be rotated in timed relationship at different rates of rotation.

I claim:

1. A sugar cane harvester with base cutting means operable to sever cane sticks from their roots; cane stick feeding means operable to feed severed cane sticks into the harvester; cane cutting apparatus mounted in the harvester to receive whole cane sticks from the cane stick feeding means and operable to cut each cane stick into at least two pieces; conveyor means to convey cut cane sticks away from the cane cutting apparatus; and drive means to drive the base cutting means, the cane stick feeding means, the cane cutting apparatus and the conveyor means; wherein the cane cutting apparatus includes a pair of cutting elements each of which is rotatably journaled on the harvester for rotation about parallel axes, at least one blade on each cutting element positioned to overlap and cooperate with a blade on the other cutting element to cut sticks passing between the cutting elements as the cutting elements rotate, each of said blades is formed from a rectangular flat steel plate with a first side surface, a second side surface, substantially parallel to the first side surface, a cutting edge running the length of the flat steel plate and spaced to one side of a plane substantially parallel to and half way between the first and second side surfaces, a first beveled surface extending the length of the flat steel plate and from the first side surface through said plane half way between the first and second side surfaces and to the cutting edge, a second beveled surface extending the length of the flat steel plate and from the second side surface to the cutting edge and having a width from the second side surface to the cutting edge that is not greater than one fourth the width of the first beveled surface extending from the first side surface to the cutting edge, clamping means for clamping each blade to a cutting element so that the cutting edge of a blade on one cutting element is parallel to the axis of rotation of the cutting element on which it is clamped and is positioned from the axis of rotation of the cutting element on which it is clamped a distance greater than one half the distance from the axis of rotation of one cutting element to the axis of rotation of the other cutting element and so that said second side of a blade on one cutter element moves into a position adjacent the said second side of a blade on the other cutter element during each rotation of the cutter elements, and a cane cutting apparatus timing and drive means for counter rotating the cutting elements and holding the blades so that when the second side of a blade on one cutting element is adjacent and parallel to the second side of a blade on the other cutter element, the distance between said second sides of the two adjacent blades is at least four millimeters.

2. The sugar cane harvester of claim 1 wherein the overlap of the arcs traced by the cutting edges of the blades, the overlap being measured along the line joining the axes of rotation of the cutting elements, lies in the range 1 to 3 centimeters.

3. The sugar cane harvester of claim 1 wherein the interior angle between the second side surface and said second bevelled surface lies in the range 135° to 160°.

4. The sugar cane harvester of claim 1 wherein the angle between a plane containing the first bevelled surface of at least one of the blades and a plane containing the second side surface of the blade is from 15° to 30°.

* * * * *